Nov. 15, 1960     W. W. CARLTON ET AL     2,959,916
SUPERSONIC INLET

Filed Oct. 7, 1957

INVENTORS
WILLIAM W. CARLTON
GERARD ALBERT SEARS
By R. E. Geauque
Attorney

United States Patent Office 2,959,916
Patented Nov. 15, 1960

2,959,916

SUPERSONIC INLET

William W. Carlton, Topsfield, Mass., and Gerard Albert Sears, Encino, Calif., assignors to The Marquardt Corporation, a corporation of California Filed Oct. 7, 1957, Ser. No. 688,534

12 Claims. (Cl. 60—35.6)

This invention relates to an inlet for supersonic air breathing power plants and more particularly to a sawtooth supersonic inlet having low drag at the cowl lip.

In conventional external compression type of supersonic inlets, a spike is supported within the cowling of the inlet and projects forwardly of the cowl so that external compression of the air takes place before the air enters the space between the cowl and the spike. The external compression results from the fact that the spike surface turns the incoming air in a direction normal to the longitudinal axis of the engine while the air is flowing along the spike. As the air enters the engine cowl, it must be turned back to flow parallel to the engine axis and the cowl lip must form a steep angle to the engine axis to accomplish this turning. Thus, that portion of the oncoming air which does not enter the engine but strikes the outside of the cowl lip is also turned at a steep angle before flowing back along the outside of the engine. This turning of the air around the lip leads to shock formation and high drag losses.

In the sawtooth inlet of the present invention, a spike is also used to initiate external compression of the air ahead of the cowl. However, turning vanes are located around the spike to turn the incoming air in a direction transverse to the original direction so that a component of flow circumferentially around the spike results. Also, the engine cowl is serrated at the leading edge to permit external compression to continue after the incoming air has been turned and before entering the inlet space between the spike and the cowl. Since the air entering the inlet space has been turned less in a direction normal to the engine axis than if axial flow of the air along the spike had continued, the cowl does not have to have as large a lip angle as the conventional inlets, and the cowl lip drag is accordingly much less.

It is therefore an object of the present invention to provide a supersonic inlet for air breathing power plants in which a flow component circumferentially around the spike is imparted into the incoming air to reduce the required lip angle of the cowl.

Another object of the invention is to provide a sawtooth supersonic inlet having turning vanes cooperating with a serrated leading edge of the cowl to permit external compression of incoming air while having a flow component circumferentially around the spike.

These and other objects of the invention not specifically set forth above, will be readily apparent from the accompanying description and drawings in which.

Figure 1:
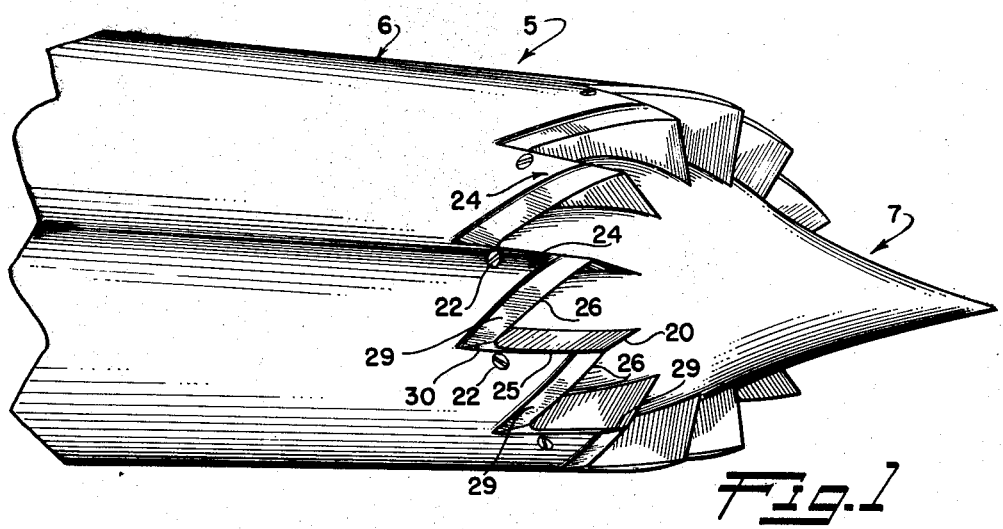
Figure 1 is a perspective view of the supersonic inlet of the present invention illustrating the spike and serrated leading edge of the cowl.

Referring to Figure 1, the supersonic inlet 5 has a cowl 6 forming the exterior of an air breathing power plant, such as a turbojet or ramjet. A diffuser spike 7 has a cylindrical body section 8 located within the cowl and a nose section 9 projecting beyond the leading edge of the cowl. The surface 10 of the nose section 9 is in the shape of an isentropic inlet spike but the invention is equally applicable to various shapes of nose surfaces, including straight conical surfaces. A plurality of radial turning vanes 11 are spaced around the spike 7 and each vane is secured to body section 8 by two bolts 12. The vanes 11 extend substantially axially of the engine and one side 13 of each vane is substantially straight except for a slight twist. The other side 14 of each vane comprises a forward turning surface section 15, a rear diverging surface section 16 and a curved center surface section 17. The surface section 15 serves to impart to the oncoming air, a flow component in a direction circumferentially around the spike and the surface section cooperates with side 13 of the adjacent vane to form a nozzle throat or restriction 18 at which normal shock usually occurs. From throat 18, air flows through the passage 19 located between surface section 16 and side 13 of adjacent vane 11 and internal subsonic compression occurs in passage 19.

Figure 2:
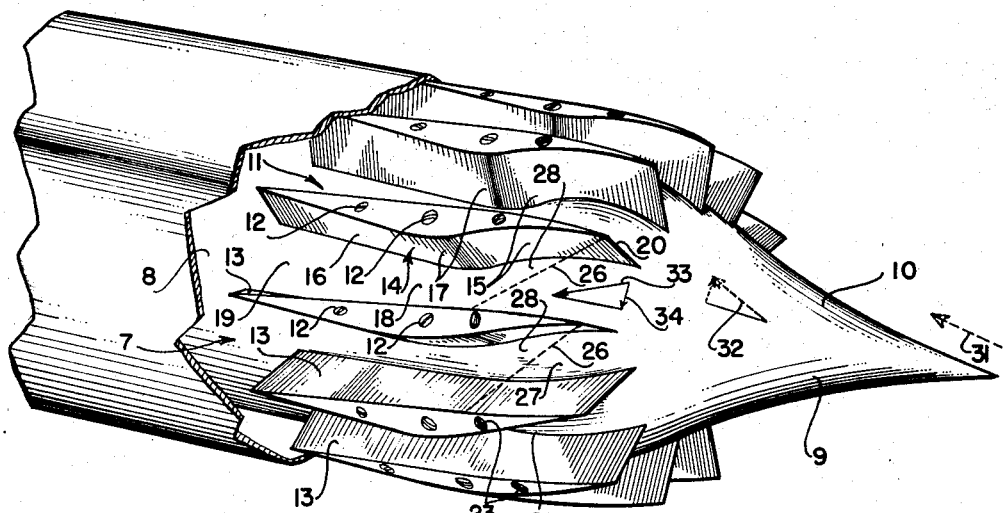
Figure 2 is a perspective view similar to Figure 1, with the cowl broken away to show the turning vanes.

As illustrated in Figures 1 and 2, the forward end 20 of each vane 11 extends forwardly along the nose surface 10 from the point 21 where the nose section meets the body section 8. The leading edge of the cowl 6 is secured to each vane 11 by bolt 22 secured in an opening 23 in each vane and the leading edge contains a number of serrations 24 equal to the number of vanes. One edge 25 of each serration commences at forward end 20 of one of the vanes and extends rearwardly along the side 13 of the vane to a point just beyond bolt 22. The other edge 26 of each serration extends from the forward end 20 to a point just rearward of bolt 24 on the adjacent vane 11. Thus, the serrations cover the passages between adjacent vanes rearwardly from edges 26 (see dotted line edges 26 of Figure 2) and therefore cover the throat 18 and the passage 19. The space between adjacent vanes forward of throat 18 has an uncovered portion 27 over which external compression can take place and a covered portion 28 in which internal supersonic compression can take place. The forward portion 29 of each leading edge 26 is tapered slightly and also a cut line 30 separates portion 29 from edge 25 of the adjacent serration 24 so that portion 29 can be bent inwardly somewhat to provide a slight lip angle.

The operation of supersonic inlet 5 will now be described in connection with the velocity vectors shown in Figure 2. Due to the supersonic speed of the inlet, the oncoming air will have a velocity relative to the inlet represented by vector 31. As the air moves along the forward portion of nose surface 10, the air is turned in a direction toward the normal to the engine axis (see vector 32) and external supersonic compression takes place. In conventional inlets, having no vanes 11, this turning towards the normal continues up to the unserrated cowl lip and the lip must overhang the surface 10 and have a steep angle in order to collect the oncoming air, which is now flowing at nearly right angles to the engine axis. However, in the inlet of Figure 2, the turning of the air toward the normal is minimized as the air is turned along the circumference of the nose surface 10 transversely to its original direction by the turning surface sections 15 of the vanes 11.

The vector 33 has the same magnitude as vector 31 and represents the flow direction of oncoming air after being turned by surface section 15. The turned flow has a component vector (not shown) normal to the engine developed during flow to the forward end 20 and a component vector 34 along the surface 10 of the spike developed by surface section 15. Since the air now has a component of flow along the curved circumference of the nose surface 10, the normal component of flow will not substantially increase before the flow is straightened out by the sides 13 of adjacent vanes located opposite surface sections 15. Thus, the incoming air entering the cowl at edges 26 will not have a large normal velocity component and a steep lip angle is not required to turn the flow back to flow parallel to the engine axis. Since the cowl does not have to have as large a lip angle as the conventional inlet, the cowl lip drag resulting from turning the air which flows outside the engine after striking the lip, is reduced.

The air flow in uncovered portion 27 undergoes external supersonic compression and the air flow in covered space 28 undergoes internal supersonic compression. Normal shock can occur at throat 18 and subsonic compression takes place aft of the normal shock. In the conventional inlets, internal supersonic compression occurs between the overhanging, high angle cowl lip and the passage formed between the cowl and the spike at the end of the nose surface. Thus, the individual passages 18 of the present invention serve the same purpose as the annular passage of a conventional inlet designed for some degree of internal compression.

While the incoming air undergoes a change in direction at surface 15 and a straightening at side 13, the drag of the inlet is substantially less than other inlets because of the low drag at the low angle cowl lip. It is understood that the shape and number of vanes can be varied as long as a turning component along the spike is imparted to the air and a restriction is present at which normal shock can occur. The lip angle of edge 26 can of course, be varied by utilizing various constructions and the position of forward edge 20 along surface 10 can be changed. It is understood that the spike located within the cowl can be supported by the cowl or by other structure independent of the cowl and that the invention is applicable to cowls in the shape of arcs, rather than completely circular, and utilizing arc-shaped spikes. Various other modifications are contemplated by those skilled in the art without departing from the spirit and scope of the invention as hereinafter defined by the appended claims.

What is claimed is:

1. A supersonic inlet comprising a cowl having a lip, spike means located within the cowl to form an air passage therebetween and extending forwardly of the lip of said cowl, means for supporting said spike means in fixed stationary relationship with said cowl, and means located adjacent said spike means for imparting to the oncoming air a velocity component of flow substantially parallel to the surface of said spike means and transverse to the original direction of the oncoming air before the air encounters the cowl lip, said imparted velocity component serving to minimize the angle of the air flow at the cowl lip.

2. A supersonic inlet comprising a curved cowl having a lip, curved spike means located within the cowl and forming a curved air passage with said cowl, means for supporting said spike means in fixed stationary relationship with said cowl, a curved nose section on said spike means extending forwardly of said lip, said nose section having a surface angularly positioned with respect to the original direction of oncoming air, and turning means on said surface for imparting to the oncoming air a velocity component of flow substantially parallel to said nose surface and transverse to the direction of the oncoming air before the oncoming air encounters the cowl lip, said spike means being continuous between said turning means and said cowl lip to provide an uninterrupted flow of the oncoming air from said turning means to said cowl lip.

3. A supersonic inlet as defined in claim 2 wherein said turning means are located on the aft portion of said surface, said surface forwardly of said turning means imparting to the oncoming air a velocity flow component in a direction normal to the axis of the inlet.

4. A supersonic inlet comprising a cowl having a lip, spike means supported within said cowl and having a nose section extending forwardly of said lip, air passage means located between said cowl and said spike means, said nose section having a surface angularly positioned with respect to the direction of oncoming air, a plurality of turning vanes extending between said spike means and said cowl and having their forward ends on said nose surface, each turning vane having a turning surface section on one side connecting with said forward end and having a flow straightening surface on the other side, said turning surface section imparting to the incoming air a velocity component of flow transverse to the direction of the incoming air and in the direction of said flow straightening surface on the adjacent vane before the air encounters the cowl lip.

5. A supersonic inlet as defined in claim 4 wherein said cowl lip comprises a plurality of serrations, one edge of each serration extending from said forward end along said flow straightening side and the other edge extending angularly to the end of said one edge of an adjacent vane.

6. A supersonic inlet as defined in claim 5 wherein said one side has a centrally located curved surface forming a restriction in cooperating with the surface of said other side of an adjacent vane, said restrictions being located aft of said other edges of said serrations.

7. A supersonic inlet as defined in claim 6 wherein said one side has a rear surface section located aft of said curved surface and diverging with respect to said other side of the adjacent vane to form a passage wherein subsonic compression occurs.

8. A supersonic inlet comprising a cylinder cowl having a lip, spike means supported within said cowl symmetrically about the axis of said cowl and having a nose section extending forwardly of said lip, said nose section having a surface angularly positioned with respect to the direction of oncoming air, air turning means extending radially between said spike means and said cowl and extending forwardly onto said nose surface for imparting to the oncoming air a transverse velocity component along the surface of said spike means after said air is externally compressed by the nose surface forwardly of said turning means, said transverse velocity component serving to minimize the increase in the flow component of the oncoming air normal to the cowl axis prior to entering said inlet at the cowl lip.

9. A supersonic inlet as defined in claim 8 wherein said turning means comprises a plurality of turning vanes, adjacent vanes having surfaces shaped to form a restriction therebetween at which normal shock can occur.

10. A supersonic inlet as defined in claim 9 wherein said cowl lip comprises a plurality of serrations, each serration having an angular edge extending rearwardly from the forward end of one turning vane to the side of and adjacent turning vane to permit external supersonic compression of said oncoming air after being turned by said turning vanes and before entering said inlet.

11. A supersonic inlet comprising a cowl having a lip, spike means supported within the cowl to form an air passage therebetween and extending forwardly of the lip of said cowl, a plurality of turning surfaces located adjacent said spike means for imparting to the oncoming air a velocity component of flow substantially parallel to the surface of said spike means and transverse to the original direction of the oncoming air before the air encounters the cowl lip and while external supersonic compression takes place, a plurality of straightening surfaces located adjacent to said spike means, one of said straightening surfaces being opposite each of said turning surfaces for imparting an axial direction to the air within said air passage while internal supersonic compression takes place and restriction means located behind the cowl lip and receiving the air after encounter with said turning surfaces and said straightening surfaces so that normal shock occurs in the vicinity of said restriction means and subsonic compression takes place in said air passage aft of said restriction means.

12. A supersonic inlet as defined in claim 11 wherein said air passage comprises separate passage means for the oncoming air encountering each turning surfaces, each of said passage means being located between one turning surface and one straightening surface, said restriction means comprising an orifice section in each of said passage means.

References Cited in the file of this patent

UNITED STATES PATENTS

| | | |
|---|---|---|
| 2,575,683 | Price | Nov. 20, 1951 |
| 2,650,752 | Hoadley | Sept. 1, 1953 |
| 2,667,741 | Price | Feb. 2, 1954 |
| 2,772,620 | Ferri | Dec. 4, 1956 |

FOREIGN PATENTS

| | | |
|---|---|---|
| 1,148,637 | France | June 24, 1957 |

(Corresponding British Patent 792,831, Apr. 2, 1958)